United States Patent [19]

Cosnet

[11] Patent Number: 4,576,531

[45] Date of Patent: Mar. 18, 1986

[54] DEVICE FOR STOWING LOADS OF LARGE-SIZED BALES OF FODDER ON A VEHICLE

[76] Inventor: Pascal Cosnet, "Le Patis", 72550 Coulans sur Gee, France

[21] Appl. No.: 731,144

[22] Filed: May 6, 1985

[30] Foreign Application Priority Data

May 9, 1984 [FR] France ................. 84 07147

[51] Int. Cl.⁴ .................. B60P 7/08; B60P 1/64; B61D 3/16; A01D 85/00
[52] U.S. Cl. ........................ 410/36; 410/38; 410/42; 410/47; 410/100; 410/153; 294/120; 414/24.5; 414/63
[58] Field of Search ............. 410/31, 32, 34, 36, 410/37, 38, 42, 47, 96, 97, 100, 103, 153; 105/387, 388, 389; 294/107, 108, 120; 414/39, 44, 24.5, 63

[56] References Cited

U.S. PATENT DOCUMENTS

| | | | |
|---|---|---|---|
| 405,819 | 6/1889 | Billings | 410/37 |
| 893,165 | 7/1908 | Haley | 105/389 |
| 1,034,494 | 8/1912 | O'Day et al. | 105/388 |
| 3,662,900 | 5/1972 | Grey et al. | 414/39 |

Primary Examiner—Robert B. Reeves
Assistant Examiner—Scott H. Werny
Attorney, Agent, or Firm—Lowe King Price & Becker

[57] ABSTRACT

Device for stowing loads of large-sized bales of fodder on a vehicle. Said device is constituted of a T-shaped movable member composed of at least one horizontally-extending elongated element in the middle part of which is perpendicularly fixed the upper end of a vertical arm, said horizontal element being equipped at each end with at least one needle which is engaged in two juxtaposed bales and said arm being equipped at its lower end with an anchoring member adapted to be engaged in at least one bale situated below two juxtaposed bales receiving the needles of the horizontal element, said device comprising two guiding members for a strap, one member of which is situated in the center of the horizontal element.

10 Claims, 15 Drawing Figures

DEVICE FOR STOWING LOADS OF LARGE-SIZED BALES OF FODDER ON A VEHICLE

The present invention relates to a device for stowing fodder such as straw, hay, ensilage, hemp, etc... packed in round or other-shaped bales of large dimensions, on a trailer.

Said apparatus enables to firmly secure loads of round bales and optionally loads of large square or rectangular bales, whatever their density, height, length and contents, and whatever the number of rows and the type of loading trailer used.

It also enables stowing while the operator remains on the ground.

The stowing means currently used for loads of round bales are the same as those used for the loads of small square bales; namely a longitudinal stowing, using two ropes placed over the load and stretched by the crank of the trailer. This method is quite unreliable, inefficient and rather dangerous in the case of large bales, because large bales, contrary to the small square bales, cannot be loaded in diagonal, on account of their size (1.20 m), they must, systematically, be juxtaposed in pairs, widthwise of the trailer, (2.40 m: authorized width) on every level (1,2 or 3). This can give rise to a longitudinal split in the middle of the load, due to the separation of the columns during bumpy rides, a split which, despite the ropes, tends to widen more and more at every bump.

It is the object of the present invention to overcome these disadvantages by proposing a device constituted of a rigid apparatus, attachable laterally on both sides of the load. Said apparatus is used in pair or in a plurality of pairs. It is combined with a strap, equipped with tighteners, which connect each device on both sides of the load. Each apparatus is "T"-shaped, it is constituted at its upper part, of a horizontal elongated part equipped at its ends with a needle and inclined downwardly, and comprises a strap-guide positioned along its vertical central axis.

Said horizontal part is held up by means of an arm, in order to be planted simultaneously and symmetrically, via its needles, in two juxtaposed bales, preferably in parallel to and level with their horizontal axes, and this on the last row of the load, said arm having the added characteristic of being equipped with at least one anchor member at its lower end. Said anchor member faces the same direction as the needles of the bar and is also equipped with a strap-guide on the opposite side of its pointed end. The device being suspended by its upper needles planted in the bales of the last row of bales, it suffices, by holding the arm and pivoting same, to drive the anchor member for example into the bale of the row immediately below, using a back to front movement, preferably below the horizontal axis of said bale, in an area where the fodder is closely packed (area selected beforehand). The needles of the device can be planted above or below the horizontal axis of the bales of the last row. The apparatuses being in position on each side of the load, in face-to-face relation, the user can then throw the straps over and across the whole assembly, one strap for every pair of devices.

The straps, being guided by the "V"-shaped spaces created between the juxtaposed round bales of the top row, are easily placed between the guides of the device through which they slide.

They are tied up on both sides of the load by means of movable tension devices fastening up to the chassis of the trailer. The effect of the anchor, then, is to limit as much as possible the vertical downwards movement of the device when the strap is tightened. According to special embodiments of the invention, the apparatus can be made of: metal, steel, aluminium or alloy, or in wood or plastic material.

The horizontal part of the "T" may be either a bar, or a plurality of superposed horizontal bars, equipped with a plurality of needles optionally fixed on the ends, or else it may be in plate form.

The vertical arm is optionally telescopic, made up of one or more elements, possibly but not necessarily parallel. Said vertical arm may have a plurality of anchors superposed on its ends, which anchors may also be fixed on the ends or distributed along at least one bar, secured to the lower part of the arm, in parallel to the upper plate carrying the needles: there is thus a plate with upper needle and a bar with lower anchor; this particular arrangement is especially designed for loadings on three rows, the device being then fastened by its needles to two juxtaposed bales of the last row on the top, and being symmetrically anchored in each bale of the first bottom row which is just below, so that the arm follows the vertical axis of the bale interposed on the second row. Contrary to a fastening system over two successive rows, the bottom bales are shifted, and in this case, anchoring is performed in only one bale. The horizontal upper part has the advantage of holding two juxtaposed bales of the last row under the pressure exerted by the strap, said horizontal upper parts being in facing relation, when traversed by a stretched strap, cause two facing bales to come closer together. The said strap being replaceable by a rope stretched by means of two reel members.

The invention will be more readily understood on reading the following description with reference to the accompanying drawings in which.

Figure 1:
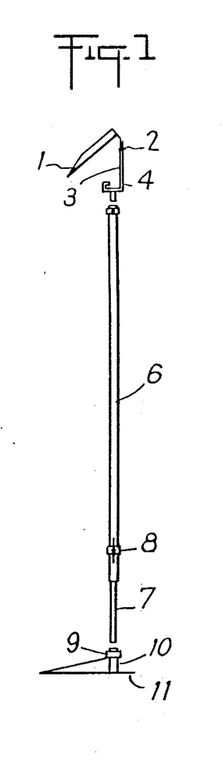
FIG. 1 is an elevational side-face view of a preferred embodiment of the stowing device according to the invention.

As illustrated in FIG. 1, the device according to the invention comprises two downward-facing needles, forming an angle of about 37° with the telescopic arm 6,7. To secure the apparatus firmly, said needles are long in order to penetrate with ease in any kind of fodder, and deep enough to hold the whole device assembly before and after anchoring. The needles 1 are bolted on the upper ends of the upper plate 3, they are made, for example, of a flat iron sheet of 5 mm×25 mm and their length is 200 mm.

Said plate 3 is a bent sheet of metal, for example of 15 mm thickness and 1180 mm length. Its vertical section is formed of seven bends constituting a reinforcement. Said plate 3 is joined to arm 6, 7 via a support plate 4, the two parts being secured together by bolts 2, which bolts have the added role of upper strap guide 2. Said support plate 4 is produced from a 2 mm-thick sheet of metal and is equipped with a lower extension permitting its adaptation on the upper part of arm 6. Said arm is composed of a tube 6, for example of 20/27 mm diameter and 1180 mm length inside which is fitted a solid round bar of steel 7, of 20 mm diameter and 1150 mm length, both parts sliding one into the other, to enable the arm to obtain the required length, and said parts being locked in position by a clamp 8 equipped with a threaded hand-hold, which clamp locks the solid bar inside the tube when tightened. The arm 6,7 ends at its lower part into an anchor 10. Perpendicularly thereto, said anchor 10 is provided with a strap guide on the opposite side of its pointed end. Said anchor 10 can for example be produced from a flat sheet of metal (see FIGS. 12, 13 and 14) of 30 mm thickness, 300 mm length and 170 mm width, it is reinforced lengthwise by a welded gusset plate 20 of 220 mm length starting from the pointed end to the anchor. It is likewise welded by the part representing its height of 40 mm to a tube 21 of 20/27 mm diameter and 60 mm length, disposed vertically. Inside said tube 21 is fixed the lower end of arm 7 by means of a clamp 9.

Figure 2:
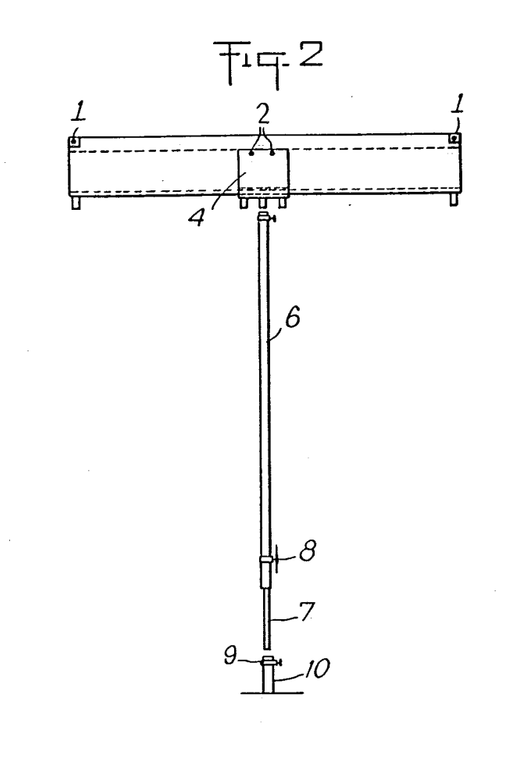
FIG. 2 is a plan view of said device.

FIG. 2 illustrates the position and bolt-fastening of the needles at the upper angles of plate 3 and the central position of support plate 4 secured by the two bolts 2, of which the two extending parts constitute between them the strap guide.

Figure 3:
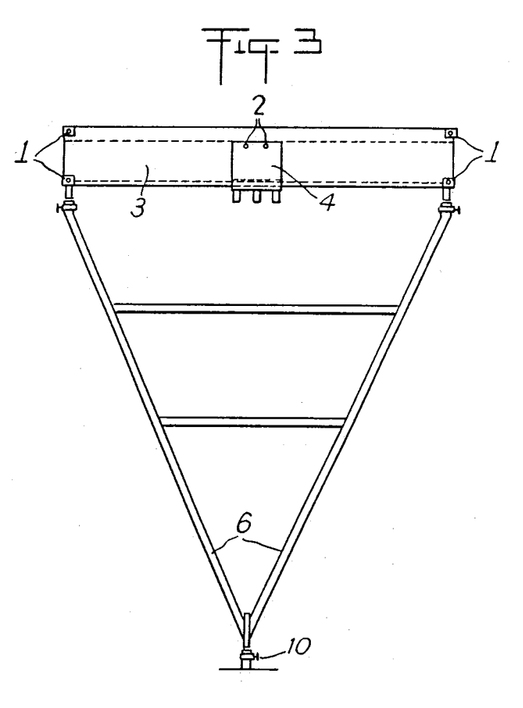
FIGS. 3, 4, 5 and 6 are variant embodiments of the needles of the arms and the anchor of the device according to the invention, said needles and anchor being non-restrictively, combinable together.

In FIG. 3, the device is illustrated with the following variants:

Four needles 1 at each angle of the plate 3.

An arm 6 which is not telescopic and starts from the two lower ends of plate 3 to converge into a single anchor 10, said arm 6 being reinforced by cross-pieces. This type of apparatus is particularly suitable for the case of less closely packed bales, four needles adhering better than two. It is also more solid at the level of the arm.

Figure 4:
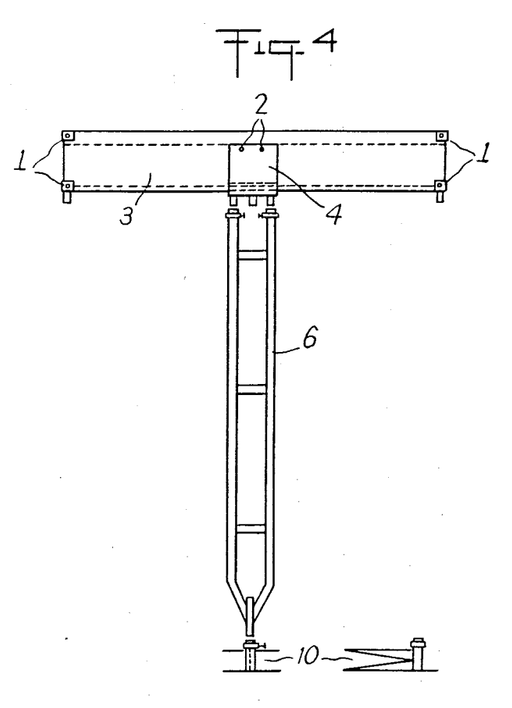

FIG. 4 illustrates a variant of the device, in which the arm 5 is non-telescopic and made up of two rods, starting from each end of support plate 4 and interconnected by cross-pieces 15. Said arms converge together and are coupled to two superposed anchors 10, this giving a great stability to the whole device and in particular a better anchoring.

Figure 5:
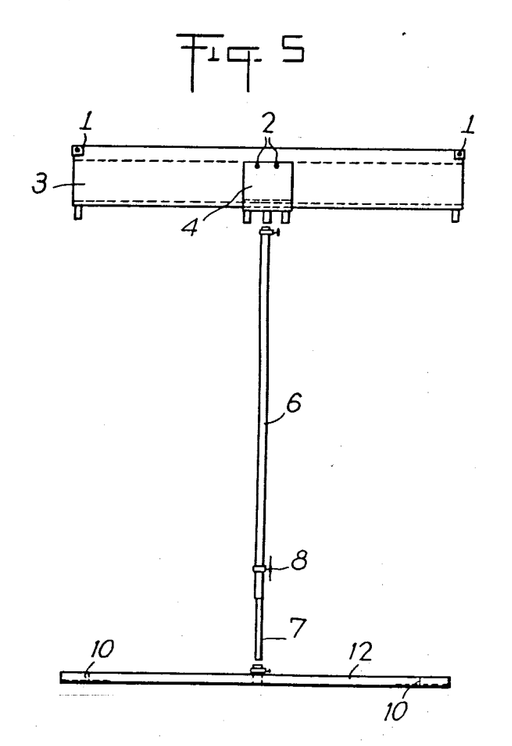

FIG. 5 illustrates a variant embodiment of the anchor according to which, parallely to the plate 3 and on the other end of telescopic arm 6, a bar 12 is equipped at each end with an anchor 10 pointing to the same direction as the needles. This gives the apparatus a better adherence to the fodder, and what is more in the case of a three-row load, said bar enables anchoring in two juxtaposed bales of the first row. The space between the anchors corresponds to the space between the upper needles. Said anchor bar may be reinforced with a plurality of parallel or non-parallel arms, in which case said bar is connected to the needle bar 3 via an arm 6, 7 which can be made up of a plurality of parts, such as shown in FIGS. 3 or 4.

Figure 6:
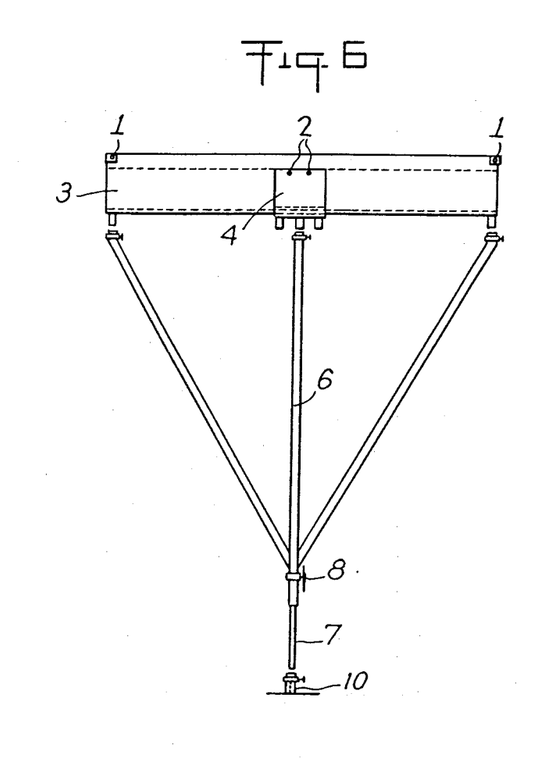

FIG. 6 illustrates a variant of the device according to which the arm 6 is made up of three parts, one part being telescopic and identical to the device shown in FIG. 1, the other two parts being disposed at an angle with a view to consolidating the device; this greatly improving rigidity.

Figure 7:
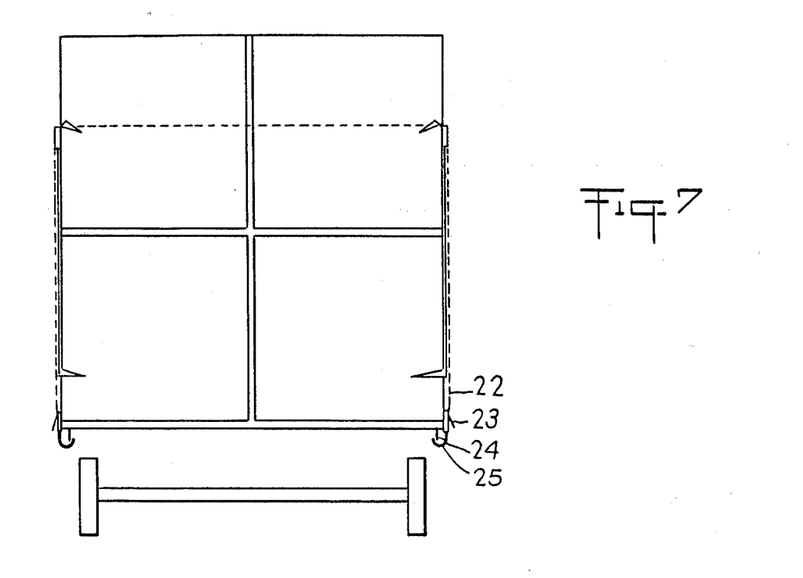
FIG. 7 is a view of the front of a trailer equipped with the stowing devices according to the invention.

FIG. 7 illustrates a front view of a cross-section of a load of round bales arranged in "two rows", stowed according to the invention, namely with devices facing one another and secured to the sides of the load, which load is overlapped in different parts by a strap 22 stretched by means of a movable tightener 23 and fastened by way of fastening means 25 to the trailer chassis 24.

Figures 8, 9:
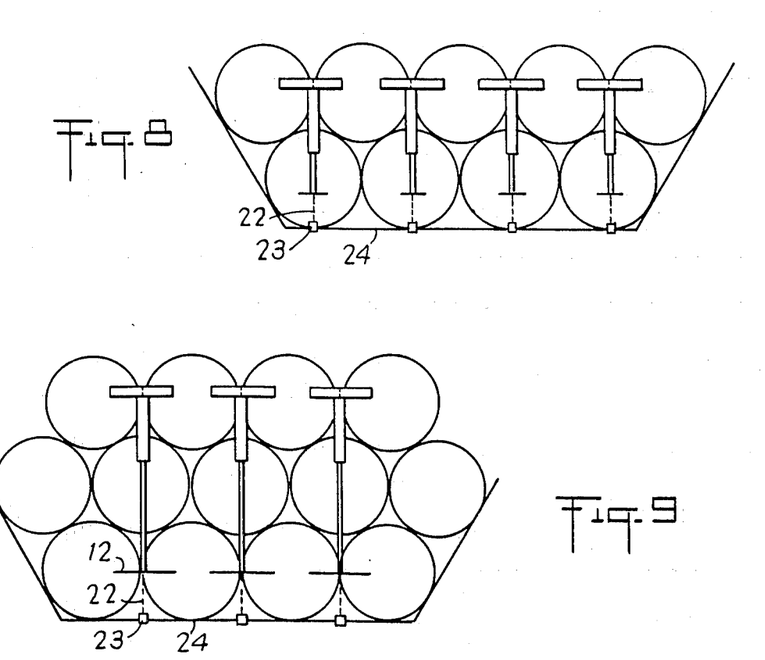
FIG. 8 illustrates a side view of a load of bales over two rows, stowed with the devices, straps and tighteners.
FIG. 9 shows a load of the bales over three rows, stowed with the device according to FIG. 5.

FIG. 8 illustrates a two-row load of round bales, stowed with the devices illustrated in FIG. 1, overlapped by a strap 22 stretched by a tightener 23 secured to the chassis of the trailer 24.

It is also possible to spread a load of round bales over three rows stowed at the level of the two top rows by means of the devices illustrated in FIG. 1.

FIG. 9 shows a three-row load of round bales stowed by means of the devices illustrated in FIG. 5, which devices consist of one bar equipped with two anchors permitting anchoring in two bales on the first row.

Figure 10:
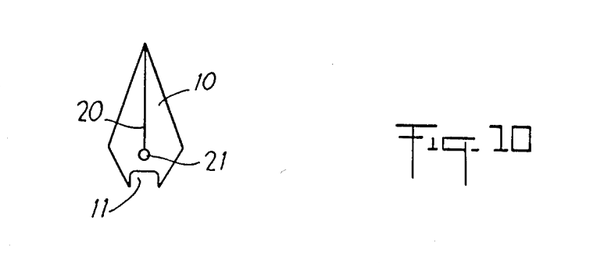
FIG. 10 is a detailed view from beneath of the anchor of the device according to the invention.
Figure 11:
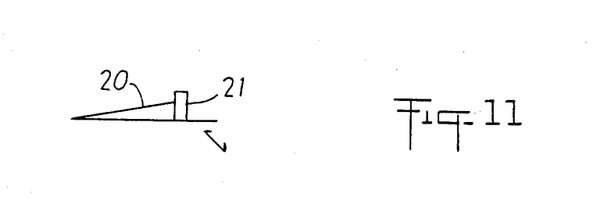
FIG. 11 is a detailed view of a longitudinal section of the anchor of the device according to the invention.
Figure 12:
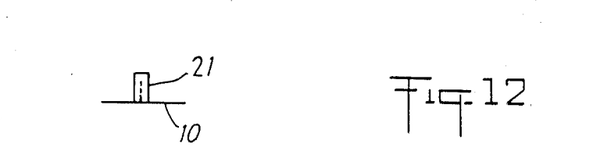
FIG. 12 is a detailed view of a crosssection of the anchor of the device according to the invention.

FIGS. 10, 11 and 12 show the back of the device from three different viewpoints, this in order to observe its shape particularly pointed at the front, its gusset in 20, its strap guide at the end opposite to its pointed end 11, and its fastening tube 21 at the lower part of arm 7.

Such a device is particularly applicable to road transports by lorries, and to agricultural trailers.

The advantage of an arrangement such as the devices, straps and tighteners according to the invention is characterized by the fact that all possibility of the bales from one load collapsing laterally is eliminated, the bales being joined together, compressed and attached by different parts to the chassis of the trailer.

Figure 13:
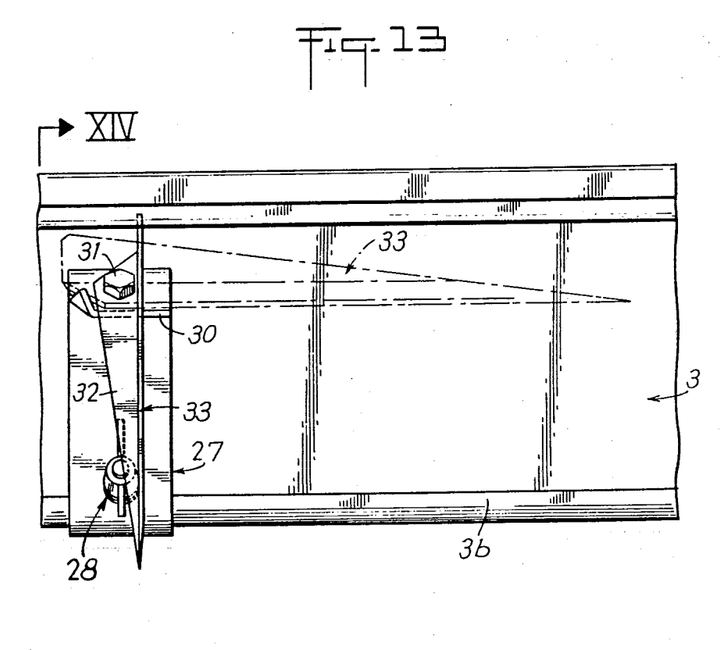
FIG. 13 is an elevational view of a horizontal element equipped with a needle mounted according to the invention.
Figure 14:
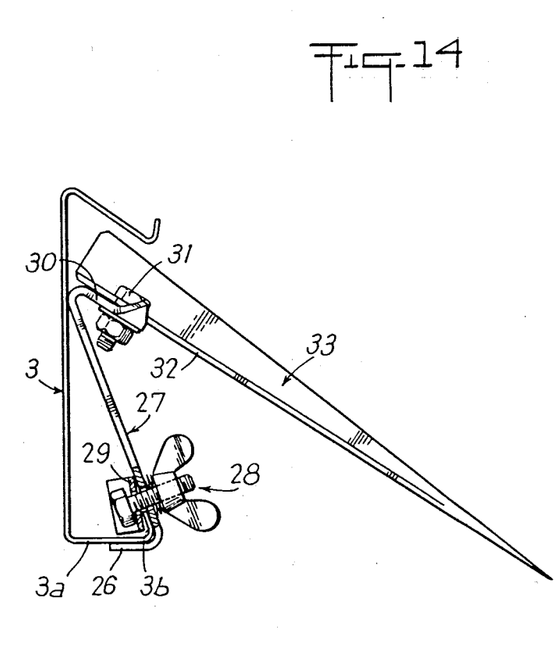
FIG. 14 is a side-face view along arrow XIV of FIG. 13.

FIGS. 13 and 14 show the horizontal elongated element which is constituted, as described hereinabove, of a U-shaped plate 3 comprising a wing 3a with a bent over edge 3b, over which is slidably mounted one of the bent-over ends 26 of a supporting member 27 held, by way of a bolt 28 and of a stop 29, in resting contact against the inside of edge 3b.

Supporting member 27 is provided at its other end with a bent-over edge 30, comprising a hole in which is mounted a bolt 31 for fastening the flanged edge 32 of a needle 33.

Said device enables to move supporting member 27 and needle 33 longitudinally with respect to plate 3 and then to secure them by tightening the bolt 28.

Moreover, the needle 33 being mounted for pivoting on the support 27, it is possible to bring same in a working position perpendicularly to the longitudinal axis of the horizontal element or plate 3, and in a bent-in or retracted position, in parallel to the longitudinal axis of said horizontal element 3.

According to another characteristic, an extension element is mounted on the lower part 7 of the vertical arm, and is locked in position by a hook member resting, by a pivoting movement, over one of the tenons of the anchoring member 10 forming the strap guide.

Figure 15:
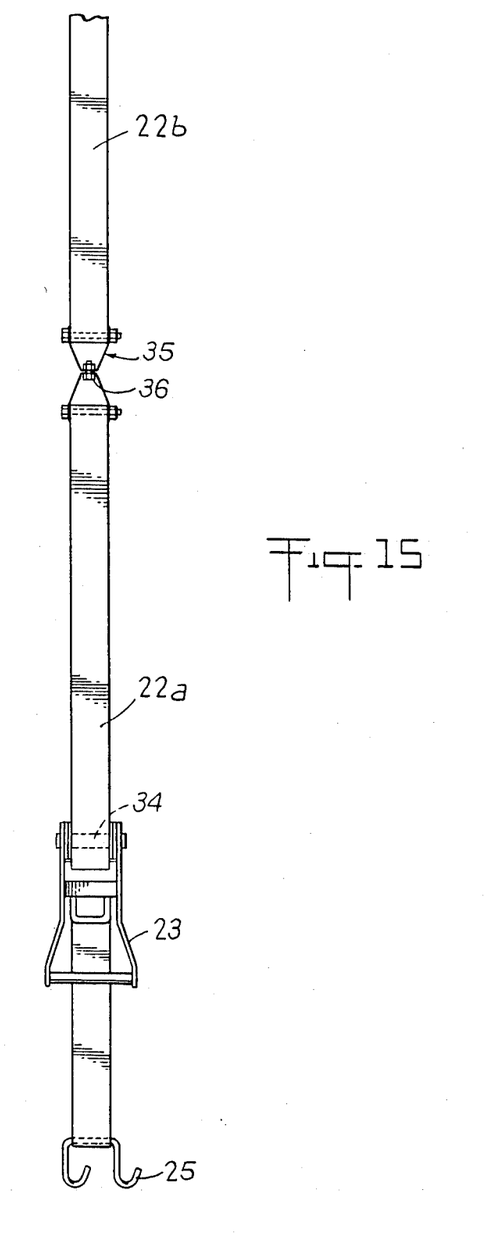
FIG. 15 shows an improvement of the strap.

As illustrated in FIG. 15, the part 22a of strap 22 is attached on one side on the ratchet 34 of tightener 23 and, on the other side, on one of the elements of a swivel 35 equipped with a pivot pin 36.

On the other element of swivel 35 is attached the other part 22b of the strap 22 which is secured to the vehicle chassis by means of a hook member 25.

This particular disposition enables to adjust the position of part 22b of the strap when tightener 23 is fitted on the chassis of the vehicle.

The invention is in no way limited to the description given hereinabove and on the contrary covers any modifications that can be brought thereto without departing from the scope thereof.

What I claim is:

1. Device for stowing loads of large-sized bales of fodder, and in particular round bales, on a vehicle, wherein said device is composed of a T-shaped movable member constituted of at least one horizontally-extending elongated element in the middle part of which is perpendicularly fixed the upper end of a vertical arm, said horizontal element being equipped at each end with at least one needle which is engaged in two juxtaposed bales and said arm being equipped at its lower end with an anchoring member adapted to be engaged in at least one bale situated below two juxtaposed bales receiving the needles of the horizontal element, said device comprising two guiding members for a strap, one member of which is situated in the center of the horizontal element along the vertical axis thereof, the other member being situated at the lower end of the arm on the opposite side of the anchoring member and, said strap being provided with means of stretching it and fastening it to the vehicle chassis.

2. Device as claimed in claim 1, wherein the vertical arm fixed on the horizontal element is telescopic.

3. Device as claimed in claim 1, wherein the needles mounted on said horizontal element are downwardly inclined.

4. Device as claimed in claim 1, wherein said vertical arm is composed of a plurality of bars, arranged in parallel and joined together by their lower end carrying the anchoring member.

5. Device as claimed in claim 1, wherein said vertical arm is triangular-shaped and is constituted of two bars, interconnected by cross-pieces and converging together at their lower end carrying the anchoring member.

6. Device as claimed in claim 1, wherein the arm carries at its lower part at least one horizontal bar parallel to the upper horizontal element, said bar being equipped with a plurality of anchoring members.

7. Device as claimed in claim 1, wherein the needles are mounted on the horizontal elongated element for sliding longitudinally via a support member on which the needle is pivotally mounted so as to occupy an active position perpendicular to said horizontal elongated element and a retracted position in which said needle is parallel to said horizontal element.

8. Device as claimed in claim 1, wherein said horizontal elongated element is constituted of a plate with a bent-over edge on which is slidably mounted the end of the support member which comprises means of clamping same on said edge, said support member having a bent-over edge on which one of the ends of the needle is pivotally mounted with clamping means.

9. Device as claimed in claim 1, wherein an extension element is mounted on the lower end of the vertical arm, which element is locked in position by a hook member resting by a pivoting movement over one of the tenons of the anchoring member, forming the strap guide.

10. Device as claimed in claim 1, wherein a pivot member is situated between two parts of the strap of which one end is fastened to the ratchet of the tightener.

* * * * *